(12) United States Patent
Morgan et al.

(10) Patent No.: US 9,450,226 B2
(45) Date of Patent: Sep. 20, 2016

(54) BATTERY PACK INTERCONNECTION SYSTEM

(71) Applicant: DELPHI TECHNOLOGIES, INC., Troy, MI (US)

(72) Inventors: Terry A. Morgan, Warren, OH (US); William C. Ketterer, Girard, OH (US)

(73) Assignee: Delphi Technologies, Inc., Troy, MI (US)

( * ) Notice: Subject to any disclaimer, the term of this patent is extended or adjusted under 35 U.S.C. 154(b) by 38 days.

(21) Appl. No.: 14/570,451

(22) Filed: Dec. 15, 2014

(65) Prior Publication Data

US 2016/0172649 A1 Jun. 16, 2016

(51) Int. Cl.
*H01M 2/24* (2006.01)
*H01M 2/20* (2006.01)
*H01M 10/48* (2006.01)
*H01M 10/0525* (2010.01)

(52) U.S. Cl.
CPC ......... *H01M 2/206* (2013.01); *H01M 10/0525* (2013.01); *H01M 10/482* (2013.01); *H01M 10/486* (2013.01); *H01M 2220/20* (2013.01)

(58) Field of Classification Search
CPC ........ H01M 2/202; H01M 2/22; H01M 2/24; H01M 2/0417
See application file for complete search history.

(56) References Cited

U.S. PATENT DOCUMENTS

| | | | |
|---|---|---|---|
| 8,574,008 B2 | 11/2013 | Große et al. | |
| 2012/0025144 A1* | 2/2012 | Lee | H01M 2/028 252/500 |
| 2012/0244397 A1 | 9/2012 | TenHouten et al. | |
| 2013/0164567 A1* | 6/2013 | Olsson | H01M 10/488 429/7 |
| 2013/0244499 A1 | 9/2013 | Heck et al. | |
| 2014/0141287 A1 | 5/2014 | Bertucci et al. | |
| 2014/0192457 A1 | 7/2014 | Zhao | |
| 2014/0255748 A1 | 9/2014 | Jan et al. | |
| 2015/0162578 A1* | 6/2015 | Kim | H01M 2/1072 429/82 |

* cited by examiner

*Primary Examiner* — Patrick Ryan
*Assistant Examiner* — Ben Lewis
(74) *Attorney, Agent, or Firm* — Robert J. Myers

(57) ABSTRACT

A battery pack assembly has a plurality of interconnected battery cells and is suitable for use in an electric vehicle or a hybrid electric vehicle. The assembly includes a first battery cell having a first terminal and a second battery cell having a second terminal electrically interconnected by a bus bar formed of a conductive material and attached to the first terminal and the second terminal. A bus bar retainer formed of a dielectric material is configured to contain the bus bar within the bus bar retainer. The bus bar has a greater freedom of movement within the bus bar retainer along a first, e.g. vertical, axis than along a second, e.g. longitudinal, axis and a third, e.g. lateral axis, wherein both the second and third axes are substantially perpendicular to the first axis and to each other. The assembly may also include individually removable temperature sensing devices.

19 Claims, 10 Drawing Sheets

BATTERY PACK INTERCONNECTION SYSTEM

TECHNICAL FIELD OF THE INVENTION

The invention relates to connection system for interconnecting battery cells in a battery pack assembly, particularly an interconnection system configured for use in an electrical vehicle or hybrid electrical vehicle.

BACKGROUND OF THE INVENTION

Battery cells, in particular lithium ion battery cells, but also metal hydride battery cells such as nickel metal hydride battery cells, or lithium polymer battery cells or other chemical energy storage devices, are becoming of ever greater importance in the motor-vehicle industry. In particular owing to the demand for alternative power concepts, for example hybrid power or pure electrical power, the storage of electrical energy is of immense significance for future motor vehicle manufacture.

The use of new types of battery cells, for example lithium ion battery cells, as electrical energy storage devices for electric motors in motor vehicle manufacture has proven advantageous. These storage devices store a large amount of energy in a small volume. Additionally such battery cells are only limitedly subject to an ageing process. In particular, no "memory effect" occurs in them. A large number of charging cycles can therefore take place, so that the lifetime of the battery cells substantially corresponds to that of a vehicle.

Most battery cells, however, only provide low voltages of between one volt and several tens of volts. These low voltages are far from sufficient to power an electric motor of an electrical vehicle. Furthermore, most battery cells only provide an electric charge of between 1 and 5 ampere-hours, which is not sufficient to power a vehicle for typical use. For this reason, battery cells are connected together to form so-called battery pack assemblies. In this case, a plurality of individual battery cells can be connected to one another in series, so that the output voltage of the battery pack assembly is multiplied according to the number of battery cells connected in series.

In the construction of battery pack assembly, the terminals of the battery cells are typically interconnected by conductive bus bars e.g. plated copper bars in order to provide sufficient current carrying capability. The bus bars are usually fastened to the terminals of the battery cells using a threaded fastener. The time required to assemble such a battery array is long due to the time needed to attach the bus bars to each battery terminal using a threaded fastener. In addition, special precautions must be taken by the assembly operators while attaching the bus bars to the terminals due to the possibility to exposure to electrical voltage from the live battery cells.

Another problem in the construction of battery pack assembly is accommodating the alignment of adjoining terminals which is subject to tolerance because of production-related variations in the production of battery cells. This means that when two battery cells are arranged next to one another substantially in a plane, the terminals may not be coplanar.

In known battery modules, there is then the problem of compensating for tolerances of the battery lengths furthermore arises. There is also the problem of connecting a plurality of battery cells to one another electrically in a working step which is simple to carry out.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a battery pack assembly having a plurality of interconnected battery cells is provided. The battery pack assembly includes at least a first battery cell having a first terminal and a second battery cell having a second terminal. A bus bar formed of a conductive material is attached to the first and second terminals, thereby electrically interconnecting the first battery cell to the second battery cell. The battery pack assembly also contains a bus bar retainer that is formed of a dielectric material and is configured to contain the bus bar within the bus bar retainer. The bus bar has a greater freedom of movement within the bus bar retainer along a first axis than along a second axis and a third axis. Both the second and third axes are substantially perpendicular to the first axis and to each other. The bus bar retainer may be configured to allow the bus bar 0.5 mm to 1.5 mm of movement along the first axis and allow less than 0.1 mm of movement along the second and third axes.

In accordance with another embodiment of the invention, the bus bar has a planar first attachment portion and a planar second attachment portion that is coplanar with the first attachment portion. The first attachment portion is separated from the second attachment portion by a connection portion. The bus bar retainer defines a slot into which the bus bar is received. The bus bar retainer also includes a resilient beam having a beveled latch on a free end of the resilient beam. The beveled latch engages the connection portion of the bus bar slidingly retaining the connection portion within the slot such that the connection portion has a freedom of movement along the first axis. The bus bar retainer defines a first opening in a first side, e.g. bottom side, of the bus bar retainer allowing physical and electrical contact between the first attachment portion and the first terminal and allowing physical and electrical contact between the second attachment portion and the second terminal. The bus bar retainer further defines a second opening in a second side of the bus bar retainer opposing the first side, e.g. top side, which allows at least visual access to the first and/or second attachment portion. The width and length of the second opening is selected to provide a finger-safe opening. The bus bar retainer also defines a third opening in the top side of the bus bar retainer that allows at least visual access to the second attachment portion. The width and length of the third opening are likewise chosen to provide a finger-safe opening.

In accordance with yet another embodiment of the invention, the first attachment portion is laser welded to the first terminal and the second attachment portion is laser welded to the second terminal. The first attachment portion may be laser welded to the first terminal by a laser beam directed through the second opening and the second attachment portion is laser welded to the second terminal by a laser beam directed through the second opening or the third opening. The battery pack assembly may further include a sense wire attached to the bus bar to enable monitoring of a battery cell voltage. The battery pack assembly may additionally comprise a temperature sensing device, e.g. a thermistor, removably disposed within the bus bar retainer. The temperature sensing device may be held within the bus bar retainer by a snap feature or by a threaded feature.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

A battery pack assembly, suitable for use in an electric vehicle or hybrid electric vehicle is presented herein. The battery pack assembly is made up of a number of individual battery cells. The individual cells are grouped into several arrays. The battery cells in each array are interconnected in series by a number of bus bars so that the battery array can provide a greater electrical voltage than an individual cell can provide. The bus bars are held within a bus bar retainer that spans the array and individually allows each of the bus bars a freedom of movement along one axis while the bar bars are attached to the terminals. This freedom of movement accommodates a positional tolerance of the terminals of the battery cells one to another. The bus bar retainer allows the bus bars to be attached to the terminals in manner that reduces the possibility of an assembly operator coming into contact with an energized terminal or bus bar.

In addition to holding the bus bars in place during attachment to the terminals, the bus bar retainer contains channels to route sense wire attached to the bus bars to a voltage monitoring device so that the voltage of individual battery cells or groups of battery cells can be checked during charging and discharge cycles to control battery charging rates or monitor the state of health of the battery pack assembly. The bus bar retainer may also hold a temperature sensing device, such as a thermistor, so that the temperature of individual battery cells or groups of battery cells can be checked during charging and discharge cycles to control battery charging rates or monitor the state of health of the battery pack assembly.

Figure 1:
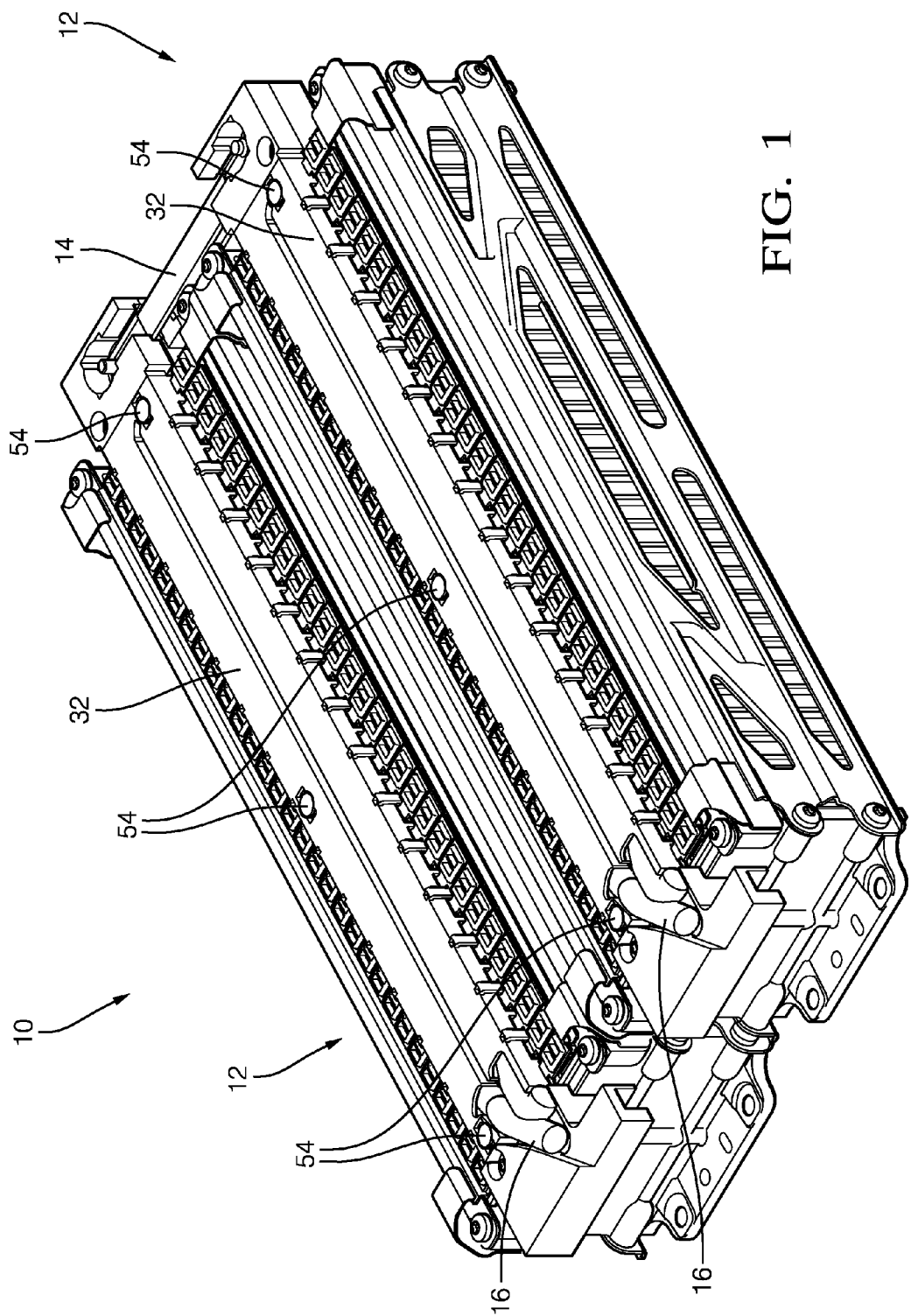
FIG. 1 is a perspective view of a battery pack assembly according to one embodiment.

FIG. 1 illustrates a non-limiting example of a battery pack assembly 10 having two battery arrays 12 of fifteen battery cells each contained within the battery pack assembly 10. The battery cells are connected in series within each array 12 and the two arrays 12 are connected in series by a crossover bus bar 14. In this example, each battery cell 18 has a voltage of about 4 volts, so the battery pack assembly 10 provides a voltage of about 120 volts at the high voltage terminals 16.

Figure 2:
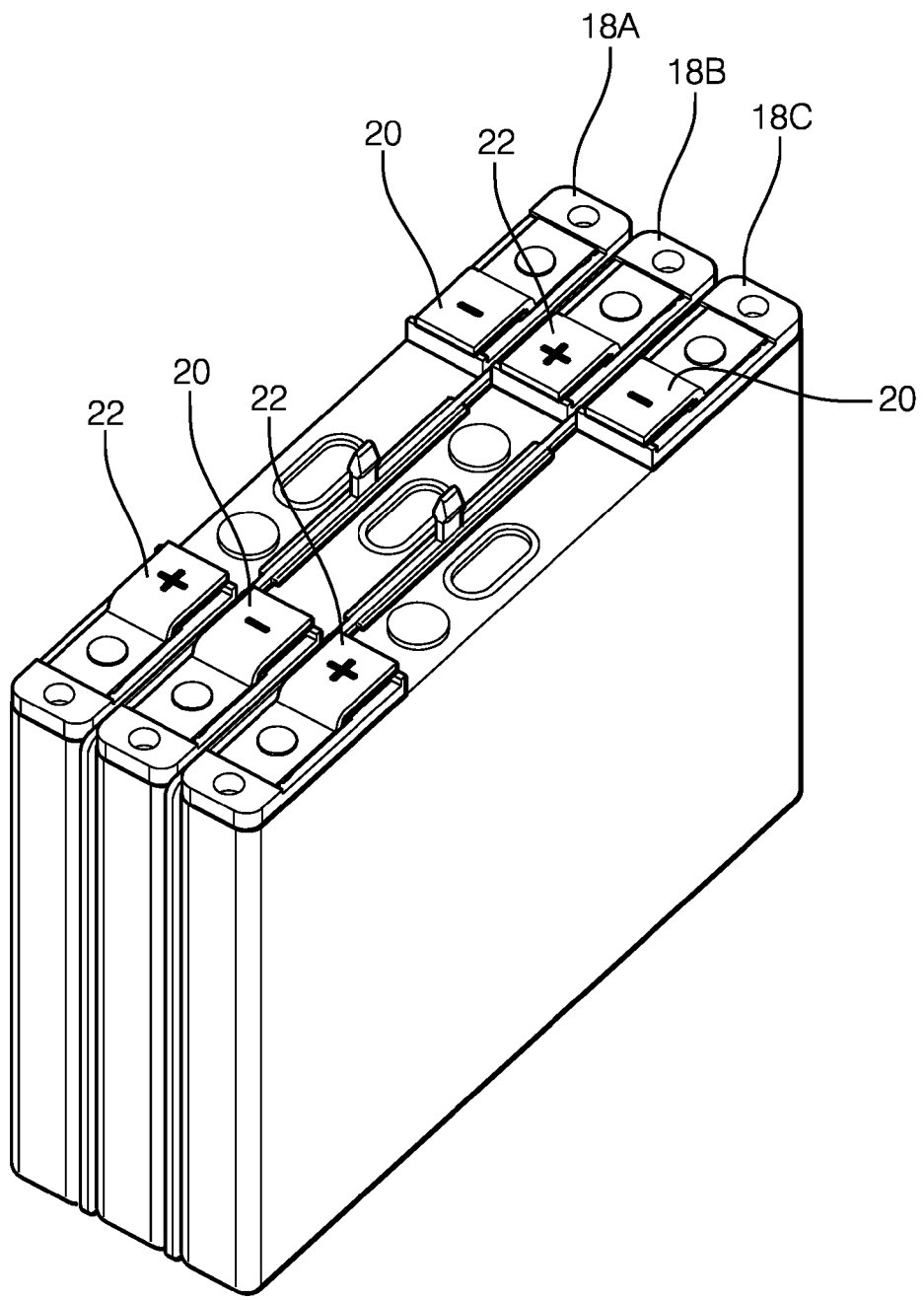
FIG. 2 is a perspective view of a number of battery cells in the battery pack assembly of FIG. 1 according to one embodiment.
Figure 3:
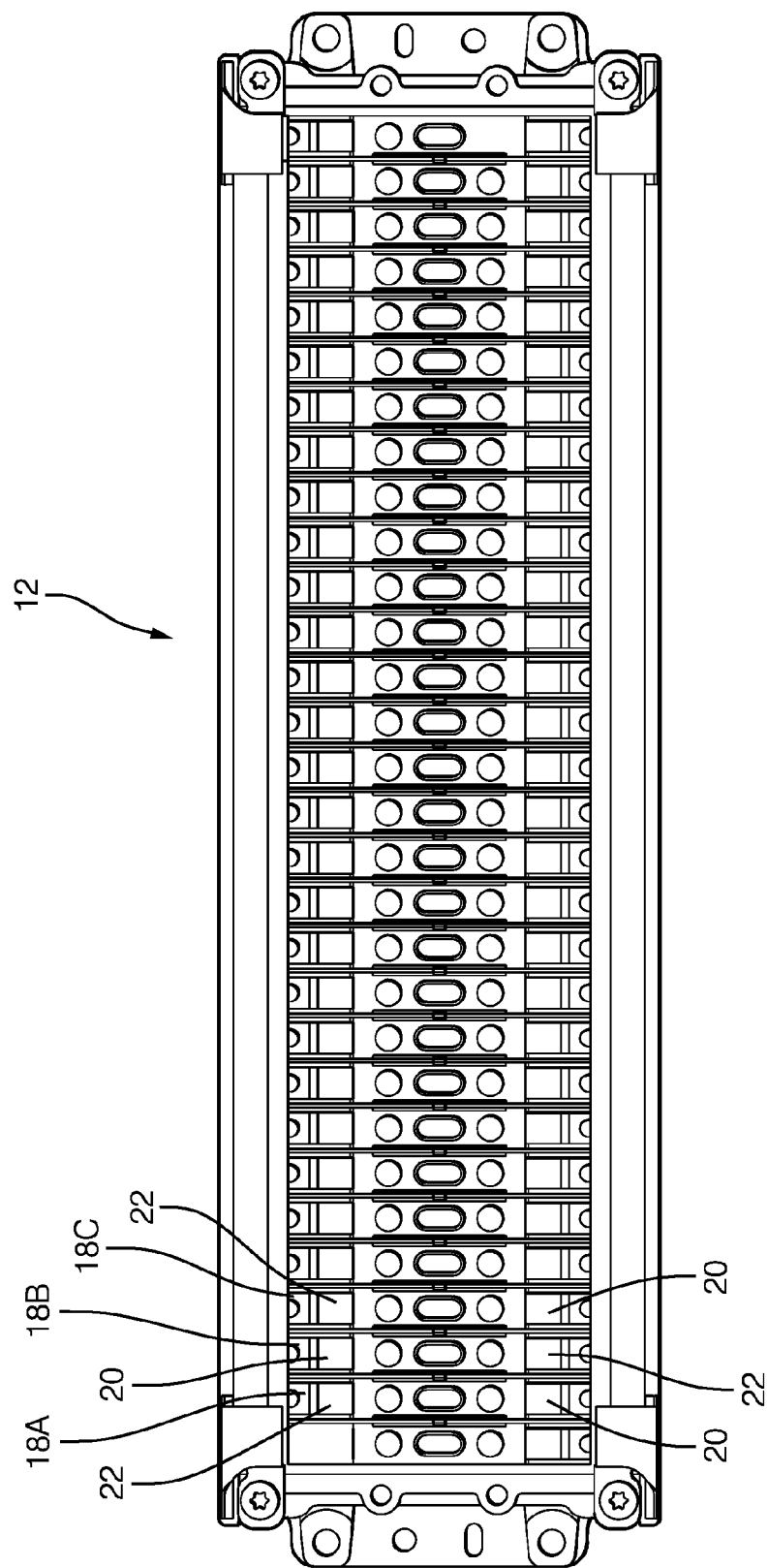
FIG. 3 is a top view of a battery array in the battery pack assembly of FIG. 1 according to one embodiment.

FIG. 2 illustrates a non-limiting example of the battery cells 18 in the battery array 12. The battery cells 18 have a generally rectangular shape. A negative battery terminal 20 is located on one end of the top side of each battery cell 18 while a positive terminal 22 is located on the opposite end of the top side of each battery cell 18. As shown in FIGS. 2 and 3, the battery cells 18 are arranged in the array 12 with an alternating orientation so that the negative terminal 20 of a first battery cell 18A is adjacent the positive terminal 22 of a second battery cell 18B and the positive terminal 22 of the second battery cell 18B is adjacent the negative terminal 20 of a third battery cell 18C, and so on. One of the terminals 20 of the battery cells 18 on each end of the array 12 may be attached to either a high voltage terminal 16 or the crossover bus bar 14.

Figure 4:
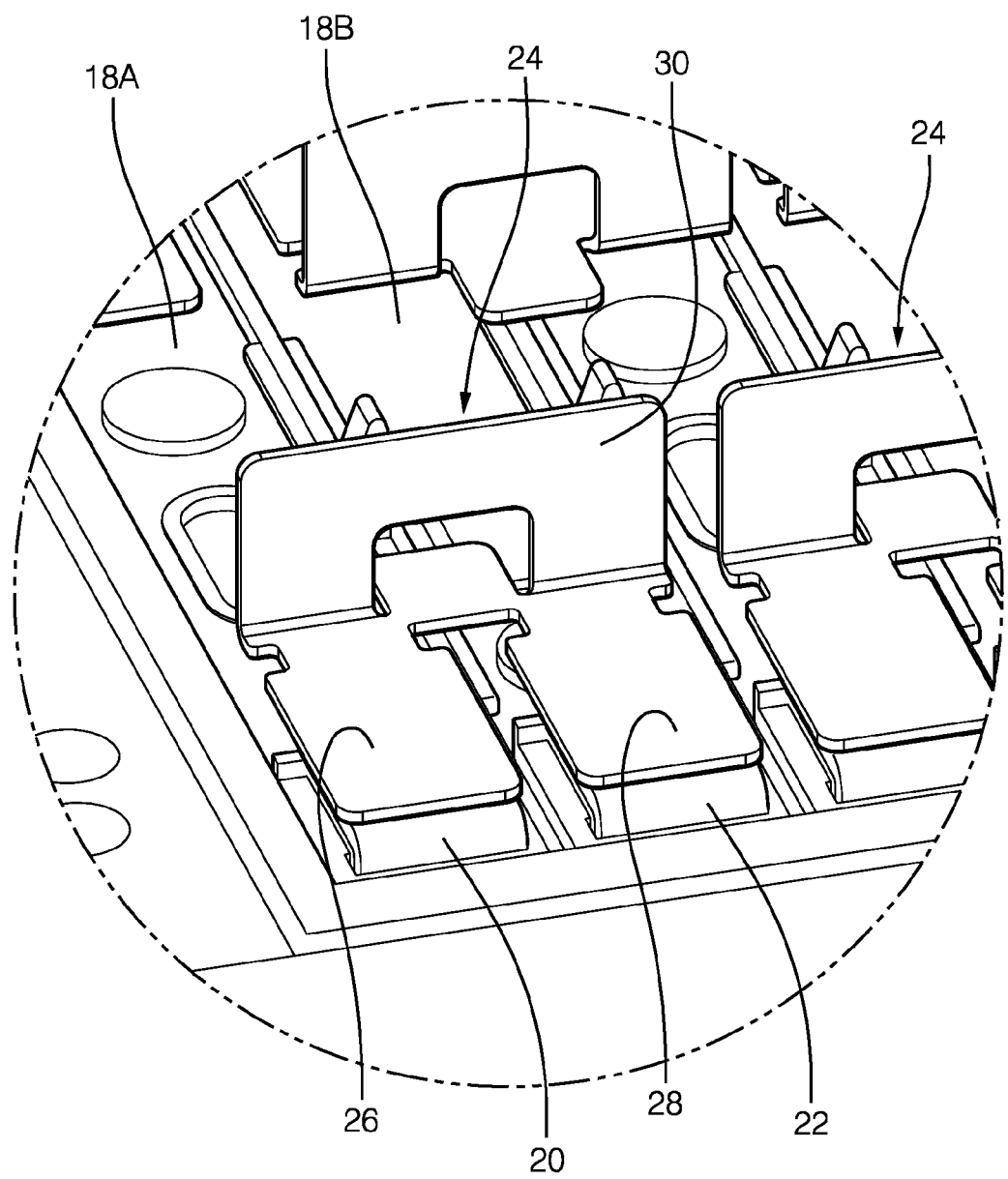
FIG. 4 is an isolated perspective view of a bus bar attached to battery cell terminals in the battery pack assembly of FIG. 1 according to one embodiment.

As illustrated in FIG. 4, the positive and negative terminals 20, 22 of the battery cells 18 are interconnected by a bus bar 24 formed of a conductive material, such as copper or a copper alloy, and attached to the positive terminal 22 of a first battery cell 18A and attached to the negative terminal 20 of a second adjoining battery cell 18B, thereby electrically interconnecting the first battery cell 18A to the second battery cell 18B. The bus bar 24 may be stamped from a sheet of material having a uniform thickness and bent of folded into the desired shape using stamping and forming techniques well known to those skilled in the art. Therefore, the bus bar 24 has a generally uniform thickness. The exemplary bus bar 24 shown in FIG. 4 has a planar first attachment portion 26 that is configured to be attached to a terminal 20 of a battery cell 18A and a planar second attachment portion 28 that is coplanar with the first attachment portion 26 and is configured to be attached to a terminal 22 of another battery cell 18B. The second attachment portion 28 is separated from the first attachment portion 26 by a connection portion 30 that is a strap folded to be substantially perpendicular to the first and second attachment portions 26, 28. The connection portion 30 may define a horseshoe shaped strap. The bus bar 24 may be attached to the terminals 20, 22 by a welding process, such as laser welding.

Figure 5:
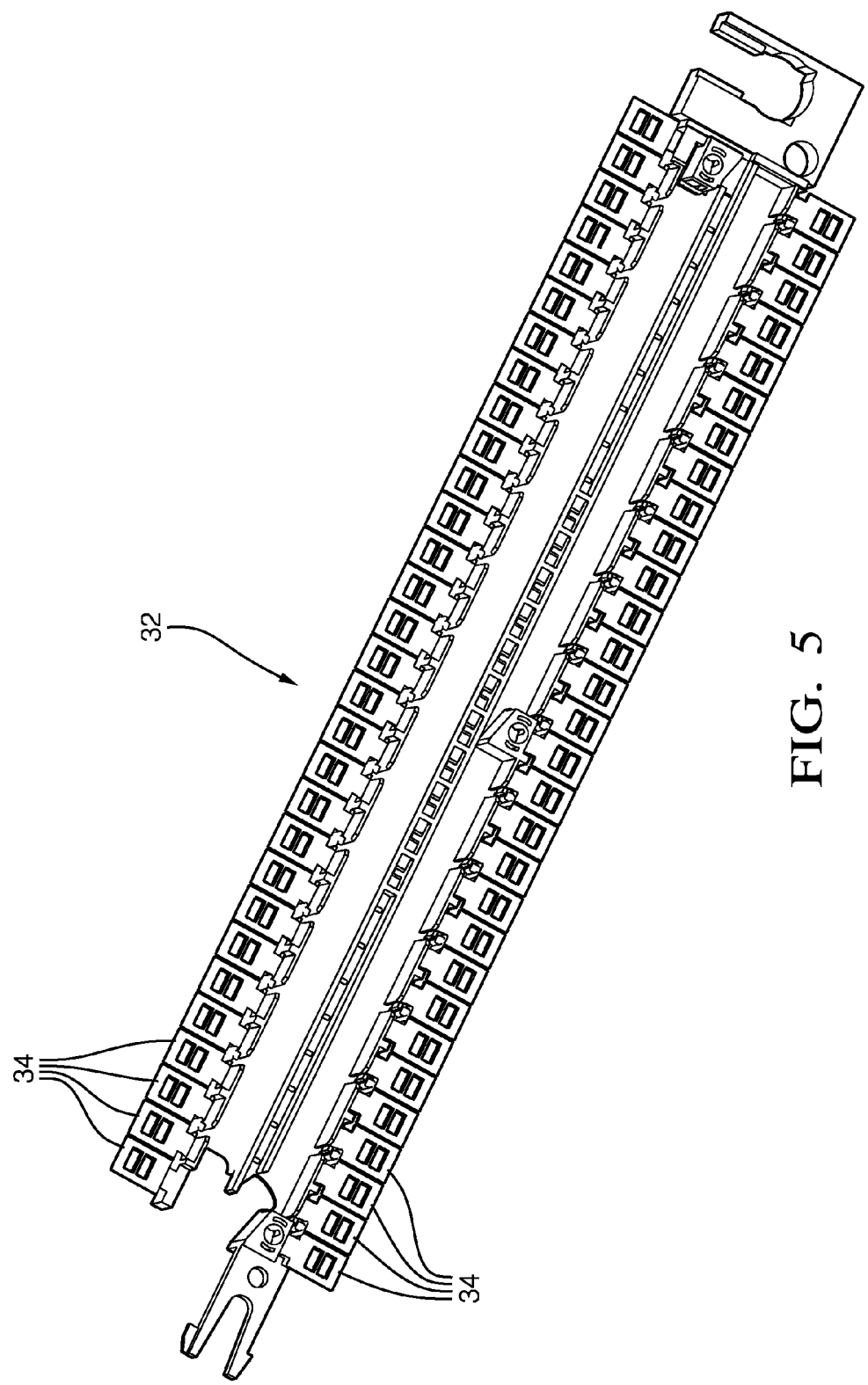
FIG. 5 is a bottom perspective view of a bus bar retainer in the battery pack assembly of FIG. 1 according to one embodiment.

As illustrated in FIG. 5, the battery pack assembly 10 also includes a bus bar retainer 32 that is configured to hold each of the bus bars 24 in place within the array 12. The bus bar retainer 32 is made of a dielectric material. The dielectric material may be a polymer material, such as glass-filled polyamide (PA, commonly known as NYLON) or polybutylene terephthalate (PBT). As illustrated in FIG. 1, the bus bar retainer 32 covers the top of the array 12, spanning the length and width of the array 12. The bus bar retainer 32 includes a number of bus bar covers 34 along the length of the array 12. Each bus bar cover 34 encloses one attachment portion 26 or 28 to inhibit inadvertent contact with the bus bars 24 when they are installed on the array 12. The bus bar retainer 32 shown in FIG. 5 includes separate bus bar covers 34 for each attachment portion of each bus bar 24; however alternative embodiments of the bus bar retainer 32 may be easily envisioned wherein the bus bar covers 34 are integrated to cover two or more attachment portions 26, 28. Additionally, the battery pack assembly 10 shown in FIG. 1 includes two separate bus bar retainers 32, one for each array 12; however alternative embodiments of the battery pack assembly may be easily envisioned wherein the two bus bar retainers are combined into a single integral assembly.

Figure 6:
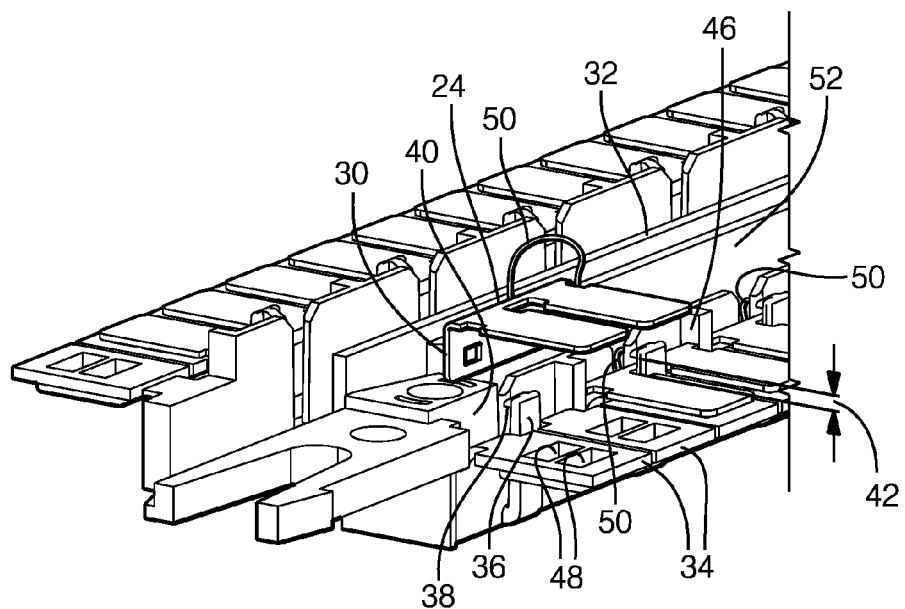
FIG. 6 is an assembly view of inserting the bus bar of FIG. 4 into the bus bar retainer of FIG. 5 according to one embodiment.
Figure 7:
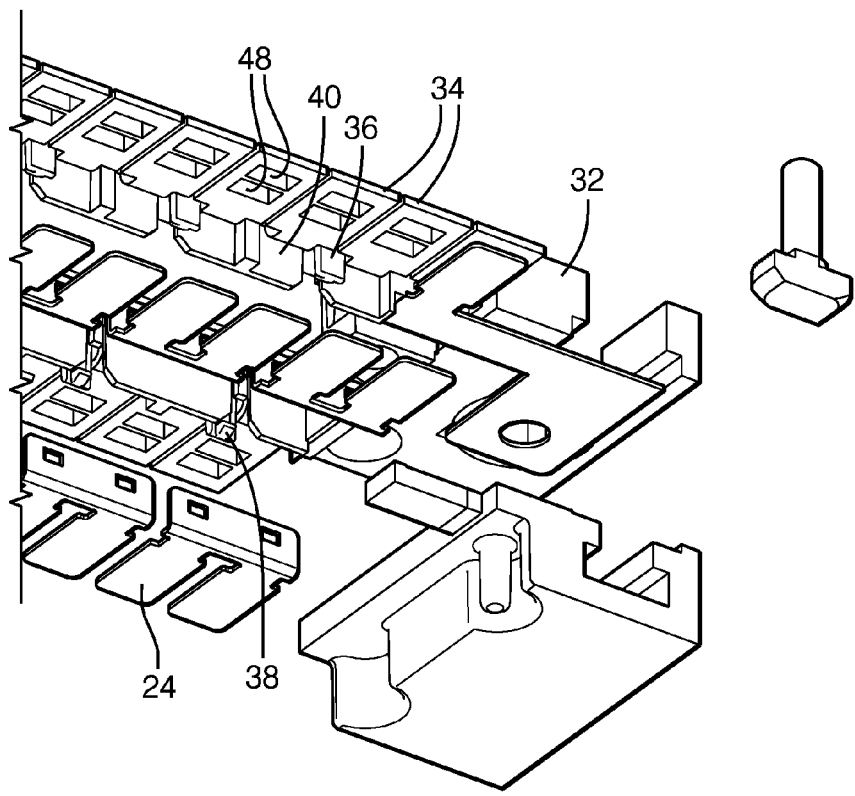
FIG. 7 is an exploded perspective bottom view of the bus bars and the bus bar retainer in the battery pack assembly of FIG. 1 according to one embodiment.

As illustrated in FIGS. 6 and 7, each bus bar 24 is retained within the bus bar retainer 32 by a resilient cantilever beam 36 having a beveled latch 38 on a free end of the beam 36. The resilient beam 36 is adjacent a slot 40 configured to receive the connection portion 30 of the bus bar 24. The beveled latch 38 engages the connection portion 30 of the bus bar 24, thus slidingly retaining the connection portion 30 within the slot 40 such that the connection portion 30, and therefore the bus bar 24, has a translational freedom of movement 42 along at least a first axis Z, in this example along the vertical axis Z. The slot 40, the connection portion 30, and the resilient beam 36 cooperate to limit the freedom of movement of the bus bar 24 along two other axes X, Y that are mutually orthogonal to the first axis Z and to each other, in this example the longitudinal axis X and the lateral axis Y. As a result, the bus bar 24 has a greater freedom of translational movement 42 within the bus bar retainer 32 along the vertical axis Z than along the longitudinal axis X and/or the lateral axis Y as shown in FIG. 6. For example, the bus bar retainer 32 may be configured to allow the bus bar 0.5 mm to 1.5 mm of movement 42 along the vertical axis Z and allow less than 0.1 mm of movement along the longitudinal and lateral axes X, Y. The translational movement 42 of the bus bar 24 allows accommodation of tolerances of vertical position of the battery terminals 20, 22 due to differences in height of the battery cells 18 and battery terminals 20, 22. The length and width of the attachment portions 26, 28 of the bus bars 24 may be chosen to accommodate the lateral and longitudinal tolerances of the battery terminals 20, 22.

Figure 8:
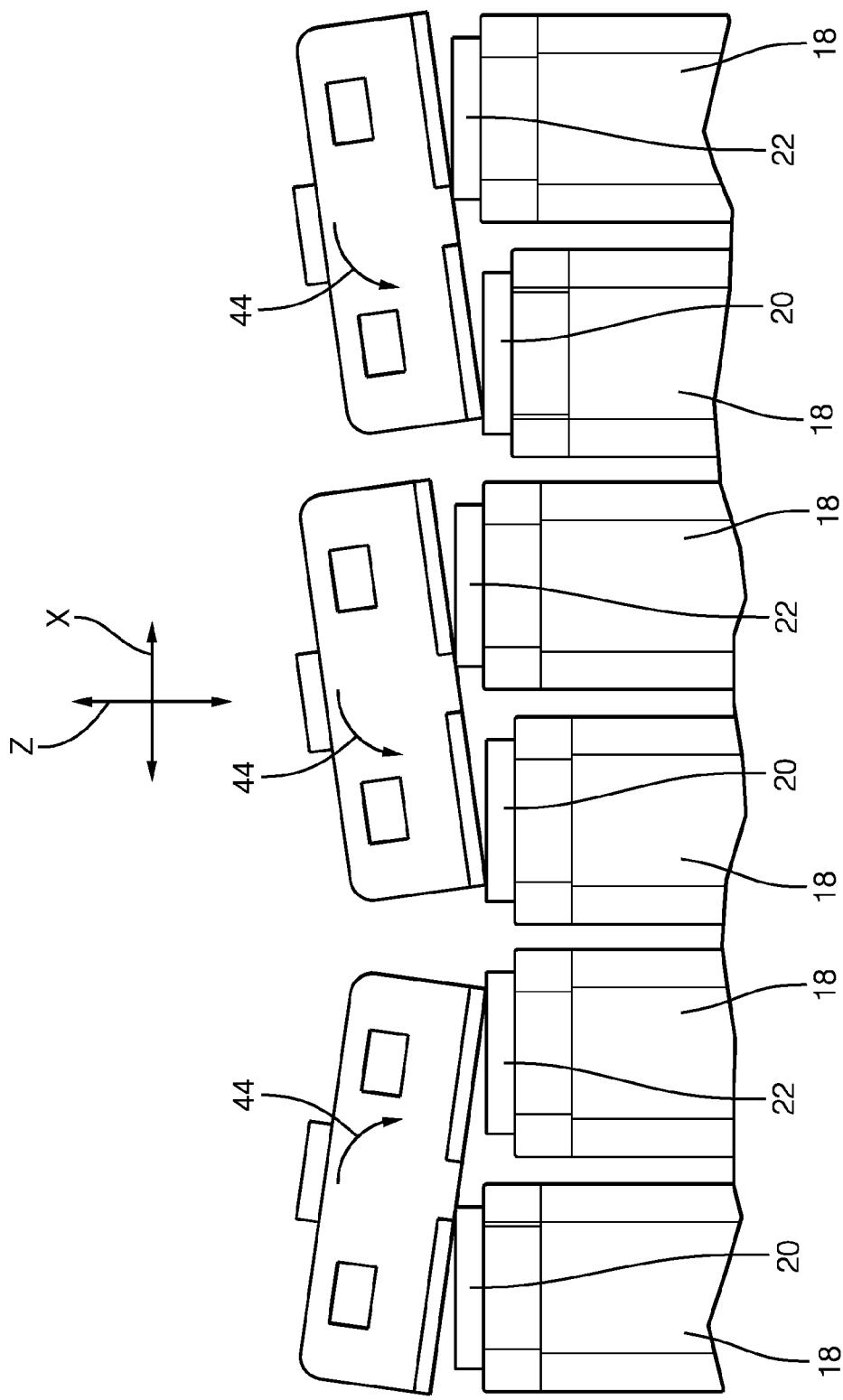
FIG. 8 is a side view of bus bars attached to battery cell terminals wherein the battery cell terminals are not co-planar according to one embodiment.

Alternatively or in addition, the slot 40, the connection portion 30, and the resilient beam 36 may cooperate to provide a greater degree of rotational movement 44 about a first axis, e.g. the lateral axis Y while limiting the freedom of rotational movement of the bus bar 24 along two other axes that are mutually orthogonal to the first axis and to each other, in this example the longitudinal and vertical axes X, Z as illustrated in FIG. 8. For example, the bus bar 24 carrier may be configured to allow the bus bar 24±30° of rotation about the lateral axis and allow less than ±5° of rotation about the longitudinal and vertical axes. This rotational movement 44 of the bus bar 24 also allows accommodation of tolerances of vertical position of the battery terminals 20, 22 due to differences in height of the battery cells 18 and battery terminals 20, 22.

As illustrated in FIGS. 6 and 7, the bus bar retainer 32 has a first opening 46 in the bottom side of the bus bar retainer 32 under each bus bar cover 34 that allows physical and electrical contact between the attachment portions 26, 28 of the bus bars 24 and the positive and negative battery cell terminals 20, 22. The bus bar retainer 32 also has a number of openings 48 in the top side of each bus bar cover 34 that allowing at least visual access to the first and/or second attachment portion 26, 28 of each of the bus bars 24. As shown in FIG. 7, each bus bar cover 34 has four openings 48. The openings 48 in the bus bar cover 34 may be used to attach the bus bar 24 to the battery terminals 20, 22 by inserting a non-conductive tool (not shown) in two of the openings 48 of adjoining bus bar covers 34 to hold the bus bar 24 to the terminals 20, 22 while a laser beam is directed through the other two adjoining openings 48 to laser weld the bus bar 24 to the battery cell terminals 20. The openings 48 in the bus bar cover 34 are sized to be finger safe so that an assembly operator or service technician cannot make inadvertent contact with one of the bus bars 24 while the battery pack assembly 10 is energized. The size of the openings 48 is dependent on the level of protection desired. For example, to provide a finger safe opening to comply with electrical protection code IP2XB, the hole effective diameter must be less than or equal to 12.5 mm.

As illustrated in FIG. 6, the battery pack assembly 10 may include a plurality of sense wires 50; one sense wire 50 attached to each of the bus bars 24. The sense wires 50 are routed through a channel 52 in the bus bar retainer 32, best shown in FIG. 5, to a voltage monitoring device, such as a battery pack controller that is part of the battery pack assembly 10. The sense wires 50 allow the voltage of each battery cell 18 to be monitored during charging and discharging cycles to determine the proper charge rate, battery pack state of charge, and/or battery pack state of health. The sense wires 50 may be attached to the bus bars 24 before the bus bar 24 is inserted into the bus bar retainer 32.

The battery pack assembly 10 may additionally include a number of temperature sensing devices 54, such as thermistors or thermocouples, to determine the temperature of the battery pack assembly 10, a battery array 12, or individual battery cells 18. The temperature sensing devices 54 are connected to a temperature monitoring device (not shown), such as the battery pack controller (not shown) by wire leads 60 that are also routed through the channel 52 in the bus bar retainer 32.

Referring once more to the battery pack assembly 10 illustrated in FIG. 1, the bus bar 24 each contain a number of temperature sensing devices 54, in this example thermistors. The temperature sensing devices 54 are located at the end and center of each array 12. It may desirable for each temperature sensing device 54 to be individually removable from the bus bar retainer 32, so that the temperature sensing devices 54 are be individually serviced in case of failure rather than requiring replacement of the entire bus bar retainer 32 assembly.

Each of the temperature sensing devices 54 is preferably in intimate contact with a battery cell 18 in order to provide adequate thermal conductivity between the battery cell 18 and the temperature sensing device 54.

Figure 9C:
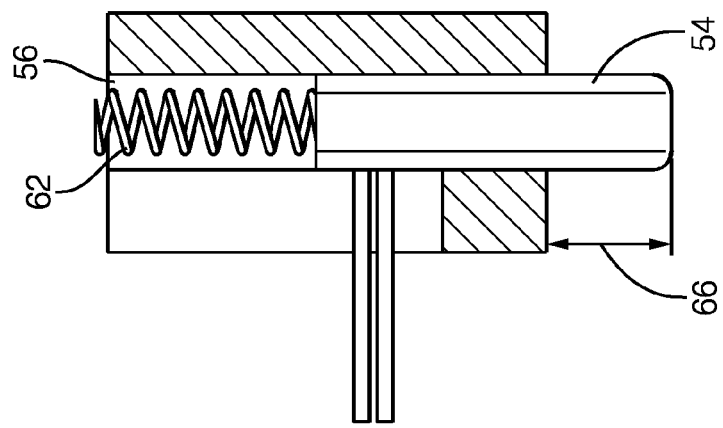
FIG. 9C is cross section side view of the bus bar retainer in the battery pack assembly of FIG. 1 illustrating the vertical freedom of movement of the temperature sensing device within the shaft according to one embodiment.
Figure 9B:
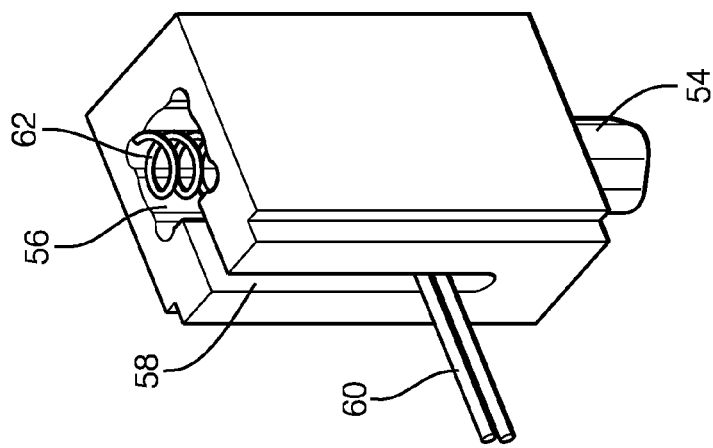
FIG. 9B is a section view of the bus bar retainer in the battery pack assembly of FIG. 1 having a shaft containing a helical spring and a temperature sensing device according to one embodiment.
Figure 9A:
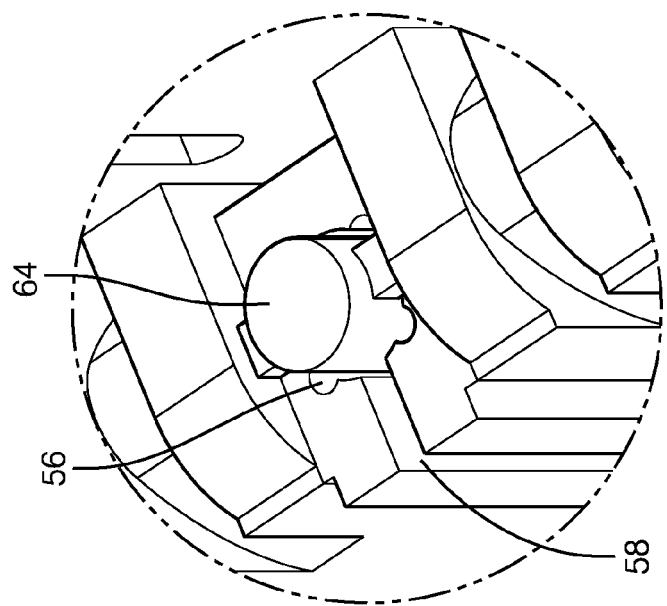
FIG. 9A is a retainer cap for a temperature sensing device in the bus bar retainer of the battery pack assembly of FIG. 1 according to one embodiment.

According to one embodiment illustrated in FIGS. 9A-9C, each temperature sensing device 54 is disposed within a shaft 56 defined by the bus bar retainer 32. The bus bar retainer 32 further defines a wire slot 58 between the slot 40 and the channel 52 through which the wires 60 connecting the temperature sensing device 54 is routed. A helical compression spring 62 within the shaft 56 biases the temperature sensing device 54 against the battery cell 18. A retaining cap 64 compresses the helical spring and retains the helical spring and the temperature sensing device 54 within the shaft 56. The retaining cap 64 may be, for example, snapped, press fit, or threaded into the shaft 56. Alternatively, other devices may be used to bias the temperature sensing device 54 against the battery cell 18, e.g. a wave washer or an elastomeric material. The temperature sensing device 54 may be capable of up to 5 millimeters of vertical movement 66 within the bus bar retainer 32 in order to assure adequate thermal contact between the temperature sensing device 54 and the battery cell 18.

Figure 10A:
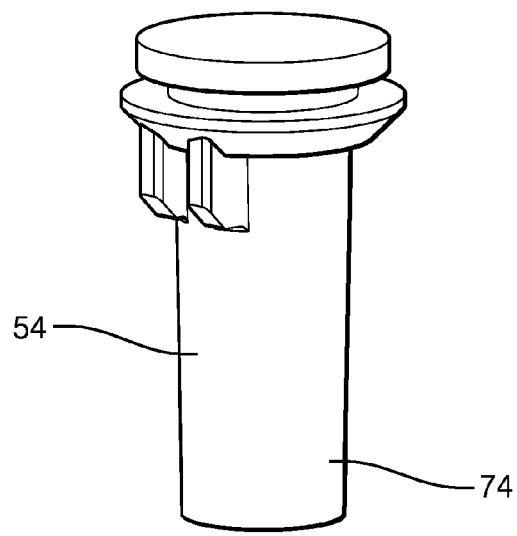
FIG. 10A is a perspective bottom view of temperature sensing device according to another embodiment.
Figure 10B:
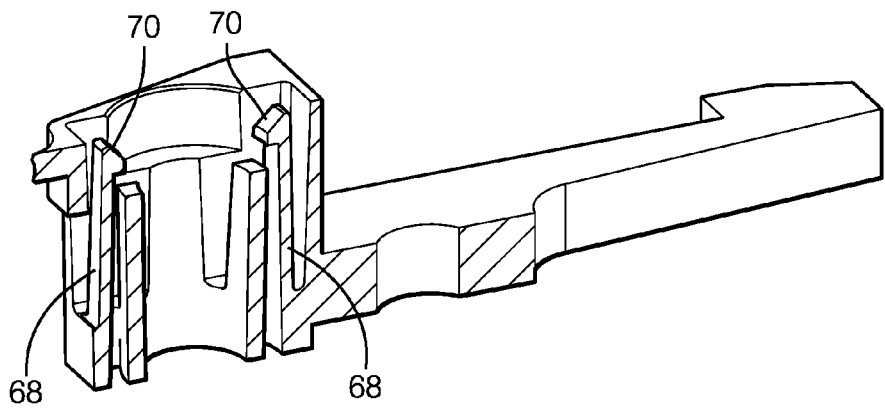
FIG. 10B is cross section perspective view of a shaft through the bus bar configured to contain the temperature sensing device of FIG. 10A according to another embodiment.
Figure 10C:
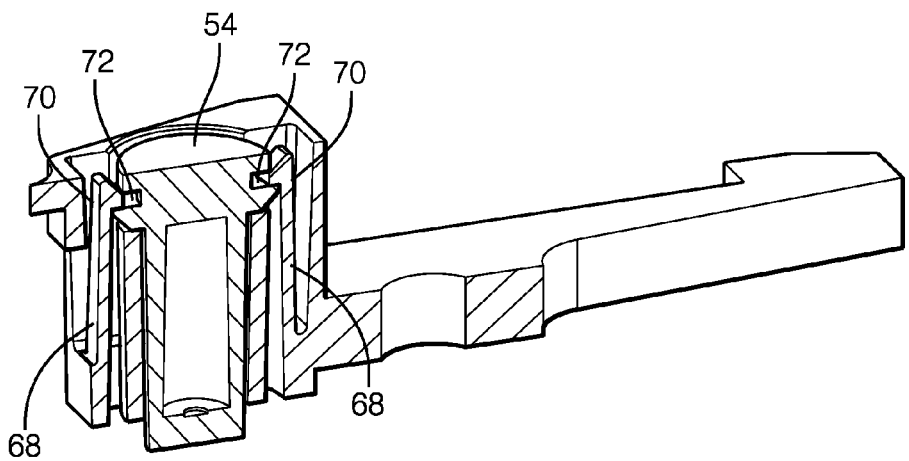
FIG. 10C is cross section perspective view of the temperature sensing device of FIG. 10A retained within the shaft of FIG. 10B according to another embodiment.

According to another embodiment illustrated in FIGS. 10A-10C, the shaft 56 includes a pair of resilient retaining arms 68 having latches 70 on the free ends that engage a groove 72 in the body of the temperature sensing device 54, thus retaining the temperature sensing device 54 within the shaft 56. The end 74 of the temperature sensing device 54 that contacts the battery cell 18 is formed of a compressible thermally conductive material, such as a silicone rubber, in order to assure adequate thermal contact between the temperature sensing device 54 and the battery cell 18.

Figure 11A:
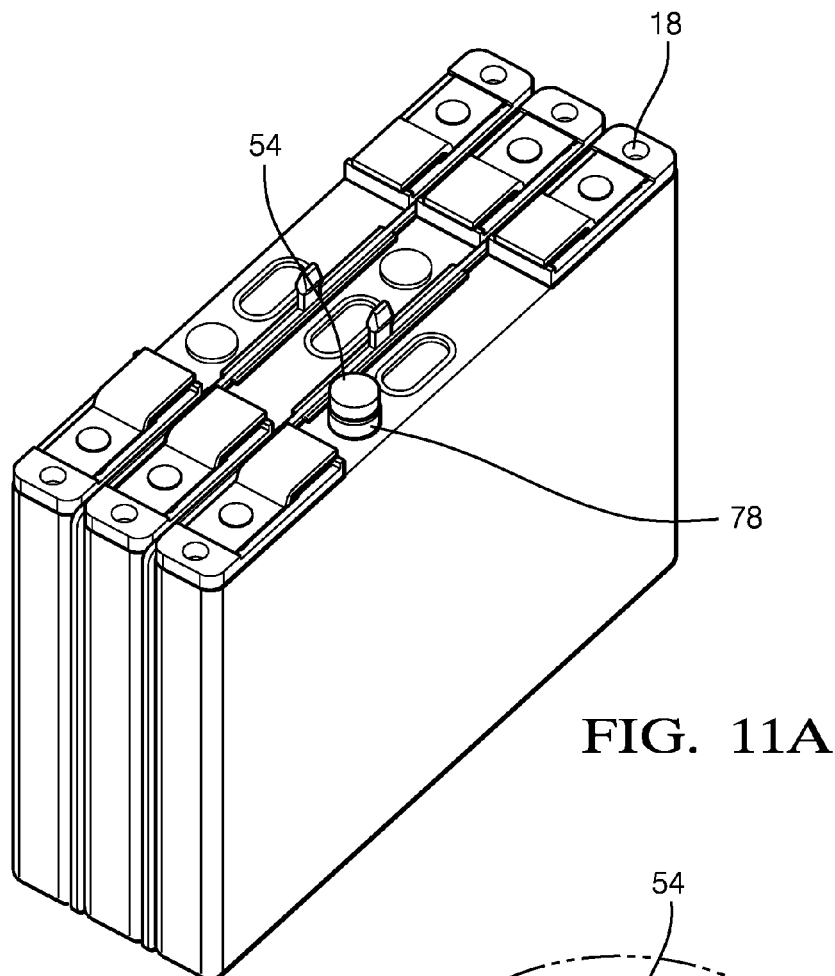
FIG. 11A is perspective view of a temperature sensing device of FIG. 11A contained within the battery cell according to yet another embodiment.
Figure 11B:
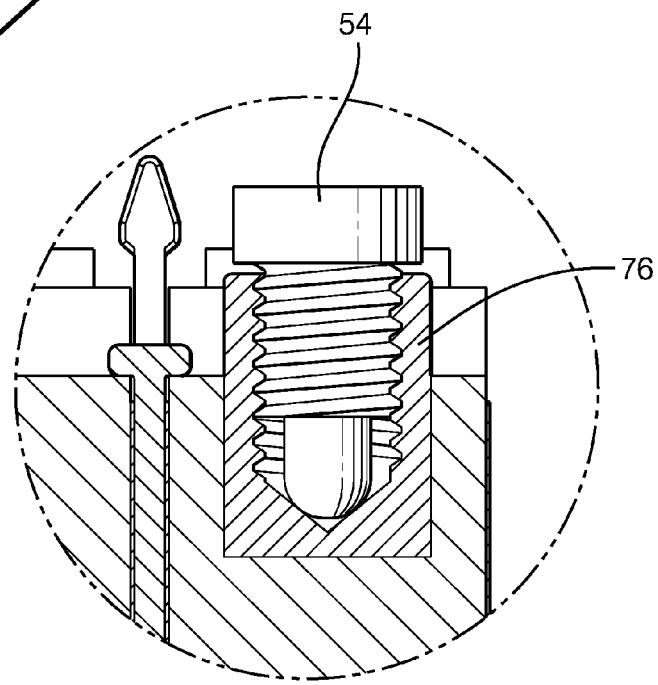
FIG. 11B is cross section side view of a temperature sensing device of FIG. 11A contained within the battery cell according to yet another embodiment.

According to yet another embodiment illustrated in FIGS. 11A and 11B, the temperature sensing device 54 is attached directly to a battery cell 18. The temperature sensing device 54 has a threaded body 76 and it is screwed into a filling cap opening 78 of a battery cell 18.

While the example illustrated herein contains rectangular battery cells 18 with both positive and negative terminals 20, 22 on the top side of the battery cell 18, alternative embodiments of the invention may be envisioned wherein the battery cells have a cylindrical shape and the positive and negative terminals are on opposite ends of the battery cell.

Accordingly a battery pack assembly 10 suitable for use in an electrical or hybrid electrical vehicle is provided. The bus bars 24 that interconnect the battery cells 18 move to accommodate differing heights of adjoining battery cells 18. The bus bars 24 are contained in a bus bar retainer 32 that allows the bus bars 24 to be attached to the battery terminals 20, 22 while protecting against inadvertent contact by assembly or service technicians with the bus bars 24 when they are energized. The battery pack assembly 10 also includes temperature sensing devices 54 that are individually removable for servicing.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A battery pack assembly having a plurality of interconnected battery cells, comprising:
a first battery cell having a first terminal and a second battery cell having a second terminal;
a bus bar formed of a conductive material and attached to the first terminal and the second terminal; and
a bus bar retainer formed of a dielectric material and configured to contain the bus bar within the bus bar retainer,
wherein the bus bar comprises a planar first attachment portion and a planar second attachment portion that is coplanar with the first attachment portion and is separated from the first attachment portion by a connection portion, and
wherein the bus bar retainer defines a slot and a resilient beam having a beveled latch on a free end of the resilient beam and wherein the beveled latch engages the connection portion of the bus bar slidingly retaining the connection portion within the slot such that the connection portion has a freedom of movement along the first axis.

2. The battery pack assembly according to claim 1, wherein the bus bar retainer defines a first opening in a first side of the bus bar retainer allowing physical and electrical contact between the first attachment portion and the first terminal and allowing physical and electrical contact between the second attachment portion and the second terminal and wherein the bus bar retainer defines a second opening in a second side of the bus bar retainer opposing the first side allowing at least visual access to the first and/or second attachment portion.

3. The battery pack assembly according to claim 1, further comprising a sense wire attached to the bus bar.

4. The battery pack assembly according to claim 1, further comprising a temperature sensing device removably disposed within the bus bar retainer.

5. The battery pack assembly according to claim 4, wherein the temperature sensing device is held within the bus bar retainer by a snap feature.

6. The battery pack assembly according to claim 4, wherein the temperature sensing device is held within the bus bar retainer by a threaded feature.

7. The battery pack assembly according to claim 1, wherein the bus bar has a greater freedom of movement within the bus bar retainer along a first axis than along a second axis and a third axis and wherein both the second and third axes are substantially perpendicular to the first axis and to each other.

8. The battery pack assembly according to claim 7, wherein the bus bar retainer is configured to allow the bus bar 0.5 mm to 1.5 mm of movement along the first axis and allow less than 0.1 mm of movement along the second and third axes.

9. A battery pack assembly having a plurality of interconnected battery cells, comprising:
a first battery cell having a first terminal and a second battery cell having a second terminal;
a bus bar formed of a conductive material and attached to the first terminal and the second terminal; and
a bus bar retainer formed of a dielectric material and configured to contain the bus bar within the bus bar retainer,
wherein the bus bar comprises a planar first attachment portion and a planar second attachment portion that is coplanar with the first attachment portion and is separated from the first attachment portion by a connection portion,
wherein the bus bar retainer defines a first opening in a first side of the bus bar retainer allowing physical and electrical contact between the first attachment portion and the first terminal and allowing physical and electrical contact between the second attachment portion and the second terminal,
wherein the bus bar retainer defines a second opening in a second side of the bus bar retainer opposing the first side allowing at least visual access to the first and/or second attachment portion, and
wherein the bus bar retainer defines a third opening in the second side of the bus bar retainer allowing at least visual access to the second attachment portion and wherein a width and length of the third opening provide a finger-safe opening.

10. The battery pack assembly according to claim 9, wherein a width and length of the second opening and the third opening provides a finger-safe opening.

11. The battery pack assembly according to claim 9, wherein the first attachment portion is laser welded to the first terminal and the second attachment portion is laser welded to the second terminal.

12. The battery pack assembly according to claim 11, wherein the first attachment portion is laser welded to the first terminal by a laser beam directed through the second opening and the second attachment portion is laser welded to the second terminal by a laser beam directed through an opening selected from a group consisting of the second opening and the third opening.

13. The battery pack assembly according to claim 12, the second attachment portion is laser welded to the second terminal by a laser beam directed through the third opening.

14. The battery pack assembly according to claim 9, wherein the bus bar has a greater freedom of movement within the bus bar retainer along a first axis than along a second axis and a third axis and wherein both the second and third axes are substantially perpendicular to the first axis and to each other.

15. The battery pack assembly according to claim 14, wherein the bus bar retainer is configured to allow the bus bar 0.5 mm to 1.5 mm of movement along the first axis and allow less than 0.1 mm of movement along the second and third axes.

16. The battery pack assembly according to claim 9, further comprising a sense wire attached to the bus bar.

17. The battery pack assembly according to claim 9, further comprising a temperature sensing device removably disposed within the bus bar retainer.

18. The battery pack assembly according to claim 17, wherein the temperature sensing device is held within the bus bar retainer by a snap feature.

19. The battery pack assembly according to claim 17, wherein the temperature sensing device is held within the bus bar retainer by a threaded feature.

* * * * *